US011070734B2

(12) United States Patent
Watanabe et al.

(10) Patent No.: US 11,070,734 B2
(45) Date of Patent: Jul. 20, 2021

(54) IMAGE PICKUP APPARATUS HAVING GRIP, AND IMAGE PICKUP LENS THEREFOR

(71) Applicant: CANON KABUSHIKI KAISHA, Tokyo (JP)

(72) Inventors: Kazuhiro Watanabe, Tokyo (JP); Harry Vermeulen, Tokyo (JP); Kenichi Nishimura, Tokyo (JP); Takeshi Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/840,787

(22) Filed: Apr. 6, 2020

(65) Prior Publication Data

US 2020/0344422 A1    Oct. 29, 2020

(30) Foreign Application Priority Data

Apr. 25, 2019  (JP) .............................. JP2019-084358

(51) Int. Cl.
*H04N 5/225* (2006.01)
*H04N 5/232* (2006.01)

(52) U.S. Cl.
CPC ..... *H04N 5/232939* (2018.08); *H04N 5/2252* (2013.01); *H04N 5/2254* (2013.01); *H04N 5/232935* (2018.08)

(58) Field of Classification Search
CPC .............................................. H04N 5/232939
See application file for complete search history.

(56) References Cited

U.S. PATENT DOCUMENTS

| D805,120 | S  | * | 12/2017 | Morishita   | ..................... D16/243 |
| 10,415,742 | B2 | * | 9/2019  | Kundu       | .................. G03B 17/563 |
| 2010/0214470 | A1 | * | 8/2010  | Cottagnoud  | .............. G05G 1/06 |
|          |    |   |         |             | 348/376 |
| 2019/0075235 | A1 | * | 3/2019  | Henry       | .................... H04M 1/185 |
| 2021/0026228 | A1 | * | 1/2021  | Wei         | .......................... G03B 17/56 |
| 2021/0055635 | A1 | * | 2/2021  | Guo         | ....................... F16M 11/123 |

FOREIGN PATENT DOCUMENTS

| JP | 2006345419 A | 12/2006 |
| JP | 2010028230 A | 2/2010 |

\* cited by examiner

*Primary Examiner* — Gary C Vieaux
(74) *Attorney, Agent, or Firm* — Rossi, Kimms & McDowell LLP

(57) ABSTRACT

An image pickup apparatus that is capable of taking and editing a content with satisfactory operability while holding a grip. The image pickup apparatus includes a display unit, a grip, an operation unit including a touch operation member extending in a slide direction for a slide operation that designates one of taken contents, a first instruction member to take, and a second instruction member to retake, and a controller that changes a display content on the display unit according to a slide operation to the touch operation member. The operation unit is provided between the grip and the display unit in a perpendicular direction to the slide direction. The first and second instruction members are provided between the touch operation member and the grip in the perpendicular direction. The first and second instruction members are respectively provided near one end and the other end of the touch operation member.

12 Claims, 11 Drawing Sheets

IMAGE PICKUP APPARATUS HAVING GRIP, AND IMAGE PICKUP LENS THEREFOR

BACKGROUND OF THE INVENTION

Field of the Invention

The present invention relates to an image pickup apparatus having a grip, and an image pickup lens therefor.

Description of the Related Art

Service that a user uploads a video image content taken using an image pickup apparatus on the Internet and exhibits the uploaded video image content has spread in recent years. When taking a moving image, a user may retake a moving image. Moreover, a portable image pickup apparatus that can be held by a user with one hand has also spread in recent years. Related techniques are proposed in Japanese Laid-Open Patent Publication (Kokai) No. 2006-345419 (JP 2006-345419A) and Japanese Laid-Open Patent Publication (Kokai) No. 2010-28230 (JP 2010-28230A).

In an image pickup apparatus of JP 2006-345419A, a grip is attached aslant to a bottom of a camera body. Moreover, an operation panel including a power switch, menu button and mode changeover switch, zoom changeover switch, etc. is provided on a backface of the camera body. In a supporting device of JP 2010-28230A, a grip body and a panhead to which a video camera apparatus is fixed are connected through a link. Moreover, an operation unit is provided in a chamfer formed in a back-upper portion of the grip body. The operation unit includes a recording start button for recording a video image, a recording button for recording a static image, and operation buttons for driving a lens unit in a wide direction and telephoto direction.

Although the image pickup apparatus and the supporting device disclosed in the above-mentioned publications are provided with the power switch, the recording start button, etc., they are not provided with a function to instruct editing of a content. Accordingly, it is difficult for a user to take and edit a content with satisfactory operability while holding the grip according to these techniques.

SUMMARY OF THE INVENTION

The present invention provides an image pickup apparatus and an image pickup lens that are capable of taking and editing a content with satisfactory operability while holding a grip.

Accordingly, a first aspect of the present invention provides an image pickup apparatus including a display unit, a grip, an operation unit including a touch operation member that is used for a slide operation that designates any one of taken contents and that extends in a slide direction, a first instruction member used for a take instruction, and a second instruction member used for a retake instruction, and a controller that changes a display content on the display unit according to a slide operation to the touch operation member. The operation unit is provided between the grip and the display unit in a direction that perpendicularly intersects with the slide direction of the touch operation member. The first instruction member and the second instruction member are provided between the touch operation member and the grip in the direction that perpendicularly intersects with the slide direction. The first instruction member is provided at a side of one end of the touch operation member in the slide direction and the second instruction member is provided at a side of another end of the touch operation member in the slide direction.

Accordingly, a second aspect of the present invention provides an image pickup lens that is detachably attached to the image pickup apparatus of the first aspect.

According to the present invention, a content can be taken and edited with the satisfactory operability while holding the grip.

Further features of the present invention will become apparent from the following description of exemplary embodiments with reference to the attached drawings.

DESCRIPTION OF THE EMBODIMENTS

Figure 1A:
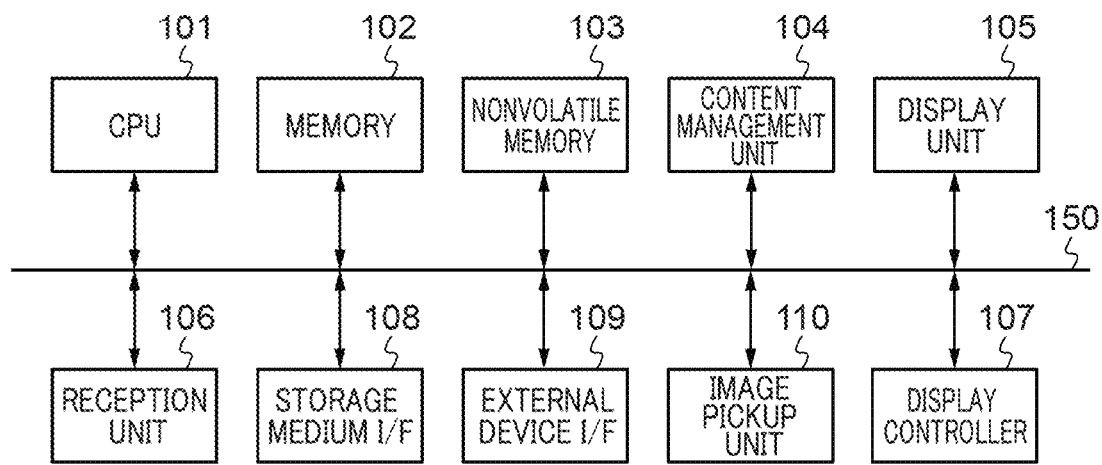
FIG. 1A and FIG. 1B are views showing an image pickup apparatus concerning a first embodiment of the present invention.

Hereafter, embodiments according to the present invention will be described in detail by referring to the drawings. Configurations described in the following embodiments are mere examples, and the scope of the present invention is not limited by the configurations described in the embodiments.

Figure 1B:
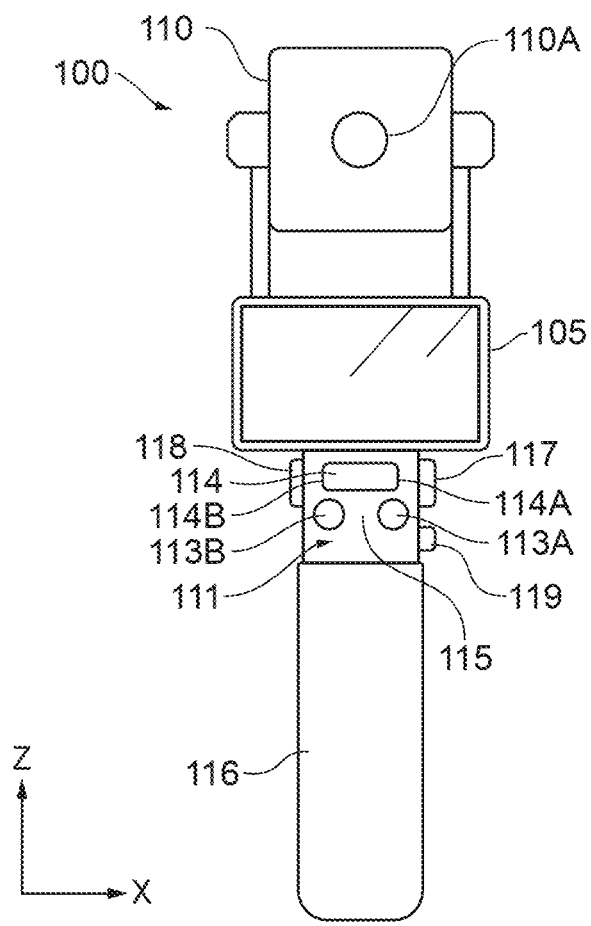

FIG. 1A and FIG. 1B are views showing an image pickup apparatus 100 concerning a first embodiment. FIG. 1A is a hardware configuration view of the image pickup apparatus 100 concerning the first embodiment. As shown in FIG. 1A, the image pickup apparatus 100 has an internal bus 150, and a CPU 101, memory 102, nonvolatile memory 103, content management unit 104, and display unit 105 are connected to the internal bus 150. Moreover, a reception unit 106, a display controller 107, a recording medium I/F 108, an external device I/F 109, and an image pickup unit 110 are connected to the internal bus 150. The components connected to the internal bus 150 are able to transmit and receive data mutually through the internal bus 150.

The memory 102 is a RAM (volatile memory using a semiconductor device), for example. The CPU 101 as a controller controls sections of the image pickup apparatus 100 according to programs stored in the nonvolatile memory 103, for example, while using the memory 102 as a work memory.

The nonvolatile memory 103 stores content data (hereinafter referred to as a content, simply), audio data, other data, and various programs that the CPU 101 executes. The nonvolatile memory 103 is a hard disk drive (HDD), ROM, etc. It should be noted that the below mentioned functions and processes of the image pickup apparatus 100 are achieved when the CPU 101 reads programs stored in the nonvolatile memory 103 and runs the read programs.

The content management unit 104 applies various processes, such as grouping and editing, to a content under control of the CPU 101. A content may be data stored in the nonvolatile memory 103 or a recording medium connected through the recording medium I/F 108, for example. Moreover, a content may be data that the image pickup unit 110 obtains. Moreover, a content may be data obtained from the external apparatus through the external device 11F 109.

The editing process that the content management unit 104 performs includes coupling and division of data, generation of new data, deletion of data, an A/D conversion process, and a D/A conversion process, etc. Moreover, the editing process that the content management unit 104 performs includes a coding process and compression process of a content, a decoding process, an expansion/reduction process (resizing), a noise reduction process, a color conversion process, etc.

The display unit 105 displays an image and a GUI (Graphical User Interface) screen that constitutes a GUI according to control of the display controller 107. Hereinafter, the display unit 105 is described as what is a touch panel display unit. That is, the display unit 105 has an input function. In the meantime, the input function of the display unit 105 may be provided in the image pickup apparatus 100 separately from the display unit 105.

The reception unit 106 is a mechanism, such as a button, a touch bar, a dial, and a joy stick, and receives input by a user. The recording medium I/F 108 can be equipped with a recording medium, such as a memory card, CD, and DVD, and reads data from the equipped recording medium and writes data into the recording medium on the basis of control of the CPU 101.

The external device I/F 109 is an interface that connects to an external device through a wired cable or wireless communication and that inputs and outputs a video signal and an audio signal. The image pickup unit 110 is a camera and is a unit that takes a content.

FIG. 1B shows an external view of the image pickup apparatus 100 of this embodiment. Although FIG. 1B shows a digital video camcorder as an example of the image pickup apparatus 100, the image pickup apparatus 100 is not limited to the digital video camcorder. The image pickup apparatus 100 can be held by a user with one hand.

The image pickup apparatus 100 has the image pickup unit 110, the display unit 105, an operation unit 111, and a grip 116. As shown in FIG. 1B, a screen of the display unit 105 and the operation unit 111 are provided in the same side.

The operation unit 111 has a first button 113A, second button 113B, and touch bar 114. A thumb rest area 115 in which no operating member is arranged is provided Between the first button 113A and the second button 113B.

The user is able to take a content while holding the grip 116 of the image pickup apparatus 100 with one hand. A content may be a video image or a static image. In the example in FIG. 1B, the image pickup unit 110, display unit 105, operation unit 111, and grip 116 are arranged along a Z direction in the figure. The grip 116 is constituted so as to extend in the Z direction. The grip 116 may not extend in the Z direction and may incline in a direction that is perpendicular to an XZ plane in FIG. 1B.

The image pickup unit 110 is a movable camera. An image pickup lens 110A of the image pickup unit 110 is detachably attached to the image pickup apparatus 100 and is exchangeable. A user who operates the image pickup apparatus 100 holds the grip 116 and operates each member of the operation unit 111 with a finger of the holding hand. Hereinafter, although the following description assumes that each member of the operation unit 111 is operated with a user's thumb, each member of the operation unit 111 may be operated with another finger.

The operation unit 111 will be described. The operation unit 111 is provided between the display unit 105 and the grip 116. The operation unit 111 includes the first button 113A, second button 113B, and touch bar 114. In the operation unit 111, the first button 113A and second button 113B are provided between the touch bar 114 and the grip 116.

One of the first button 113A and second button 113B functions as a take button and the other functions as a retake button. The take button is used for an instruction of taking a content. The retake button is used for an instruction of retaking a content. The first embodiment is described under the presumption that the first button 113A functions as the take button and the second button 113B functions as the retake button.

When the first button 113A functions as the take button, the first button 113A becomes a first instruction member used for a take instruction. When the second button 113B functions as the retake button, the second button 113B becomes a second instruction member used for a retake instruction. In this case, the first instruction member and the second instruction member are arranged in a first arrangement relationship. The function of the first button 113A and the function of the second button 113B can be exchanged by control of the CPU 101, for example. It should be noted that the function of the first button 113A and the function of the second button 113B may be fixed. For example, the first button 113A may function only as the take button, and the second button 113B may function only as the retake button.

The touch bar 114 is a linear touch operation member that receives a touch operation, and is a linear touch sensor, for example. The touch bar 114 extends in a slide direction. The slide direction is a direction of a slide operation and is an X direction in the example in FIG. 1B.

If the Z direction is a vertical direction and the X-direction is a lateral direction, the touch bar 114 is a laterally long member. One of two ends of the touch bar 114 in the X direction shall be a right end 114A and the other shall be a left end 114B. The right end 114A and left end 114B respectively correspond to one end and another end. The touch bar 114 receives a tap operation, slide operation, double-tap operation, etc. and outputs information about a received operation to the CPU 101.

A tap operation is an operation that touches the touch bar 114 with a finger and lifts the finger without moving within a predetermined period. A slide operation is an operation that touches the touch bar 114 with a finger and moves a touch position in the X direction while touching. A double-tap operation is an operation that quickly and continuously touches the touch bar 114 twice with a finger within a predetermined period.

As mentioned above, the first button 113A and second button 113B are provided between the touch bar 114 and the grip 116. The first button 113A is provided at the side of the right end 114A (one end side) of the touch bar 114 and the second button 113B is provided at the side of the left end 114B (the other end side) of the touch bar 114. For example, the first button 113A is provided at a near position within a predetermined range from the right end 114A of the touch bar 114. Moreover, the second button 113B is provided at a near position within a predetermined range from the left end 114B of the touch bar 114.

The touch bar 114 is a member for operating a timeline image and a cursor that are displayed on the display unit 105. The details about the timeline image and the cursor are mentioned later. The CPU 101 changes displayed contents on the display unit 105 in response to an operation to the touch bar 114. The touch bar 114 is an operating member that is different from the display unit 105 and does not have a display function.

The first button 113A, second button 113B, and touch bar 114 are arranged within a predetermined range from the position of the grip 116 nearest to the operation unit 111. That is, the first button 113A, second button 113B, and touch bar 114 are arranged at positions (operatable positions) to which a thumb of a user's hand that is holding the grip 116 can reach.

According to data from National Institute of Advanced Industrial Science and Technology, the 5th percentile of a back-side length of a thumb of Japanese male is "50.1 mm" and that of Japanese female is "46.2 mm". Accordingly, the first button 113A, second button 113B, and touch bar 114 are arranged within an area of which distance from the position of the grip 116 nearest to the operation unit 111 is not more than "46.2 mm". This enables a user to operate the first button 113A, second button 113B, and touch bar 114 with a thumb of a hand that is holding the grip 116.

Moreover, the image pickup apparatus 100 has a power key 117, home key 118, and menu key 119. The power key 117 is a key for instructing power activation or power deactivation. The home key 118 is a key for displaying a predetermined home screen on the display unit 105. The menu key 119 is a key for displaying a predetermined menu screen on the display unit 105.

Figure 2A:
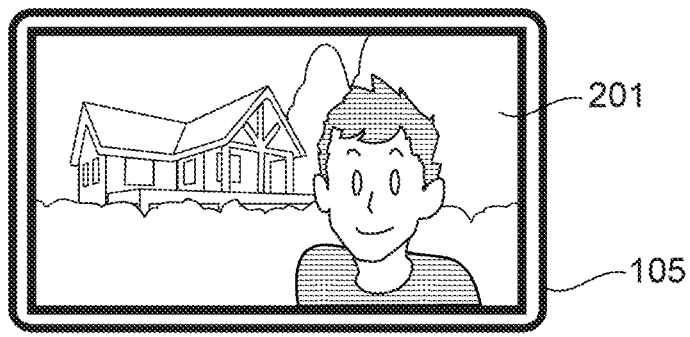
FIG. 2A, FIG. 2B, and FIG. 2C are views showing screen examples displayed on a display unit of the image pickup apparatus.
Figure 2B:
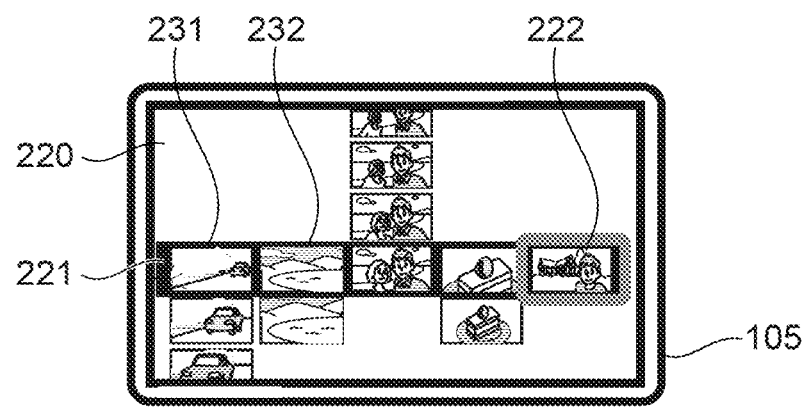
Figure 2C:
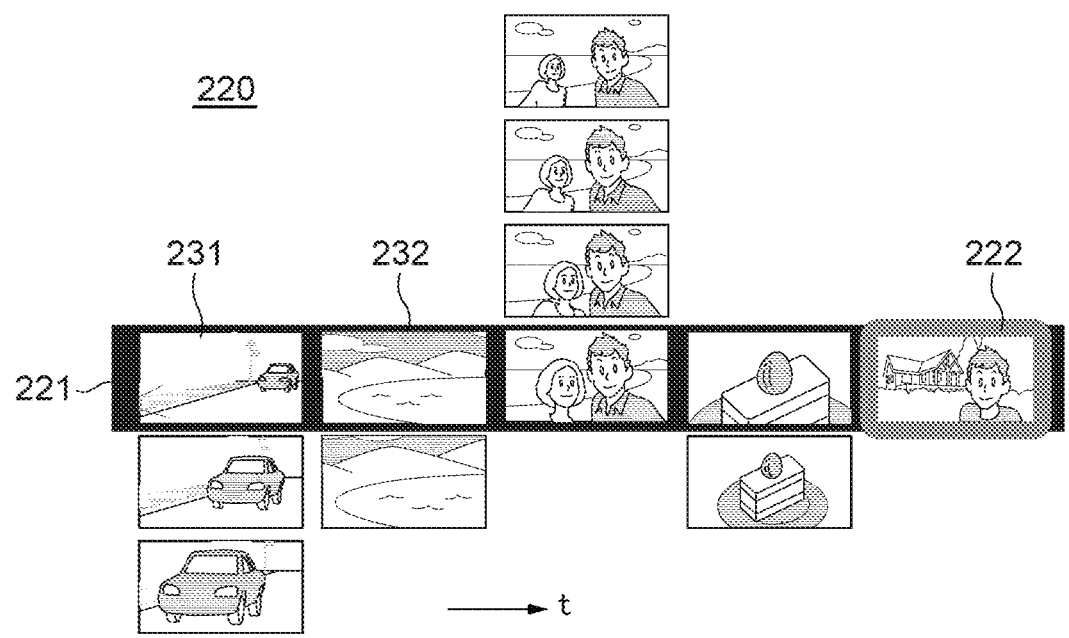

FIG. 2A, FIG. 2B, and FIG. 2C are views showing screen examples displayed on the display unit 105. FIG. 2A shows an example where a live view image 201 is displayed on the display unit 105. FIG. 2B shows an example of a timeline image 220 as a display content. FIG. 2C is an enlarged view of FIG. 2B. In the timeline image 220, plurality of regions (231, 232, . . . ) are arranged in time series along a time axis that shows passage of time.

A main line 221 indicates the time axis, and thumbnail images showing contents are displayed in the respective regions of the main line 221 side by side in time series. Thumbnail images of contents belonging to the same group are arranged along an axis (a take axis) that is different from the main line 221. In the embodiments, the main line 221 intersects the take axis at right angle. A thumbnail image showing one of contents belonging to the same group can be located in the main line 221 by a predetermined operation.

The timeline image 220 scrolls in a time-forward direction or a time-reverse direction by a user's slide operation on the touch bar 114. In the timeline image 220, one of the thumbnail images is highlighted with a cursor 222. The cursor 222 shows which content is selected at the time point. And the cursor 222 is used to designate one of the thumbnail images in the main line 221. When a thumbnail image is designated, one of the contents is designated.

Figure 3:
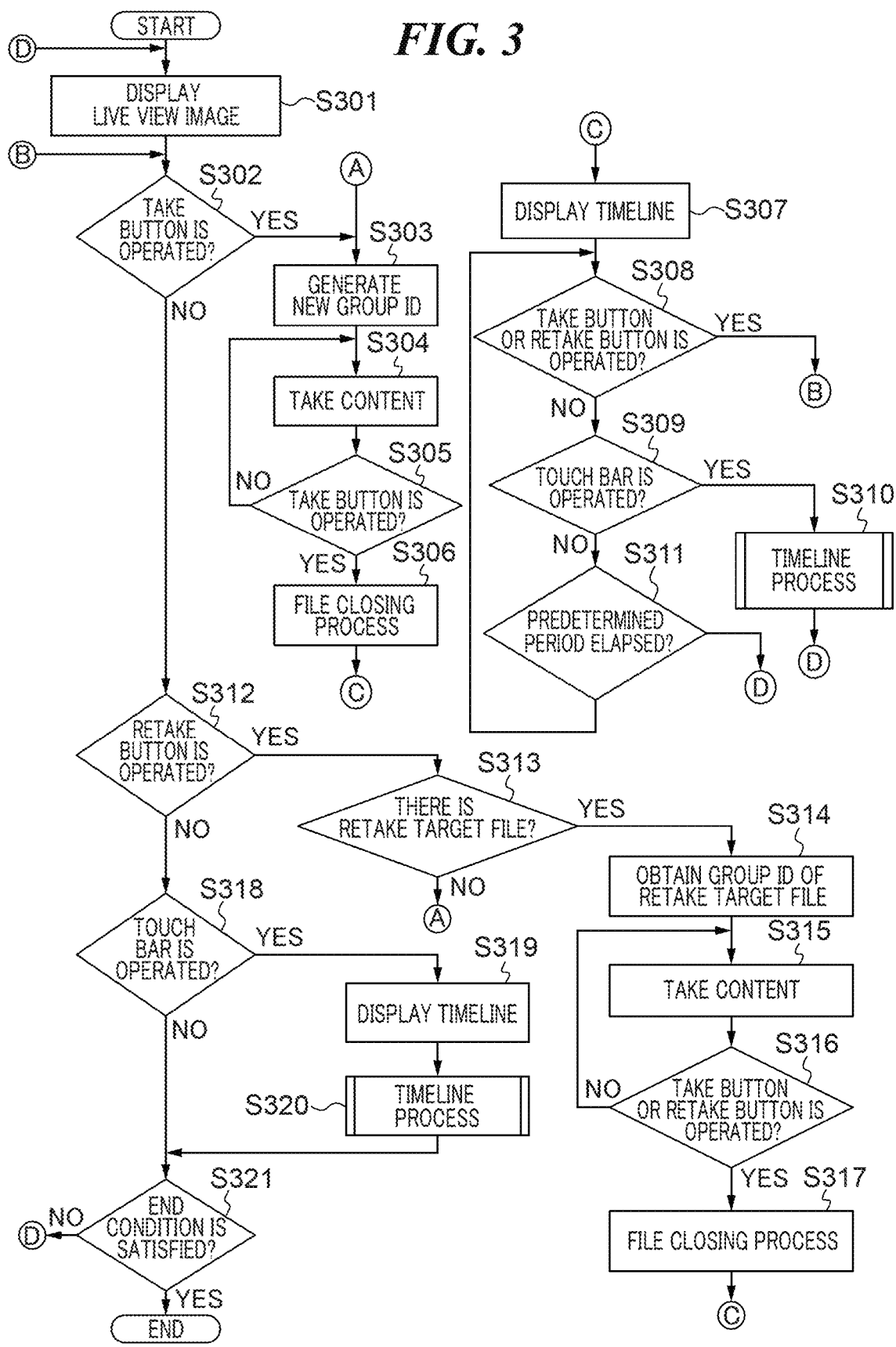
FIG. 3 is a flowchart showing a flow of a process concerning a first embodiment.

FIG. 3 is a flowchart showing a flow of a process concerning the first embodiment. The CPU 101 displays the live view image 201 on the display unit 105 (S301). Then, the CPU 101 determines whether the first button 113A that functions as the take button is press-operated by a user (S302). Hereinafter, the press operation to the first button 113A or the second button 113B is referred to as an operation, simply.

When the determination result in S302 is Yes, the CPU 101 generates a new group ID (S303). The ID shows an identification information. Then, the image pickup unit 110 takes a content (S304). After that, the CPU 101 determines whether the first button 113A that functions as the take button is operated (S305). When the determination result in S305 is No, the CPU 101 returns the process to S304 and continues taking the content. When the determination result in S305 is Yes, the CPU 101 determines to be instructed to stop taking the content and executes a file closing process (S306). At this time, the CPU 101 records the taken content as a single data file and gives the group ID generated in S303 to the data file. A new content is taken as mentioned above.

Then, the CPU 101 proceeds with the process to S307 from "C". The CPU 101 displays the timeline image 220 on the display unit 105 (S301). After that, the CPU 101 determines whether the first button 113A or the second button 1113B is operated (S305). When the determination result in S308 is Yes, the CPU 101 proceeds with the process to S302 from "B". When the determination result in S308 is No, the CPU 101 determines whether the touch bar 114 is operated (S309).

When the determination result in S309 is Yes, the CPU 101 executes a timeline process (S310). Details of the timeline process are mentioned later. After the timeline process is executed, the CPU 101 proceeds with the process to S301 from "D". When the determination result in S309 is No, the CPU 101 determines whether a predetermined period elapsed (S311). The predetermined period can be set up arbitrarily. When the determination result in S311 is Yes, the CPU 101 proceeds with the process to S301 from "D". Thereby, the live view image 201 is displayed on the display unit 105. When the determination result in S311 is No, the CPU 101 proceeds with the process to S308.

When the determination result in S302 is No, i.e., when the first button 113A that functions as the take button is not operated, the CPU 101 determines whether the second button 113B that functions as the retake button is operated (S312).

When the determination result in S312 is Yes, the CPU 101 determines whether there is an effective data file (hereinafter, referred to as a "retake target file") of a content that has already taken and is subjected to retaking in the nonvolatile memory 103 (S313). Whether there is an effective retake target file in the nonvolatile memory 103 is determined by presence of the group ID mentioned above. For example, when the second button 113B that functions as the retake button is operated in a state where any data file of a content is not stored in the nonvolatile memory 103, the determination result in S313 is No. In this case, the CPU 101 proceeds with the process to S303 from "A".

When the determination result in S313 is Yes, the CPU 101 obtains the group ID given to the retake target file (S314). Then, the image pickup unit 110 takes a content (S315). After that, the CPU 101 determines whether the first button 113A that functions as the take button or the second button 1113B that functions as the retake button is operated (S316).

When the determination result in S316 is No, the CPU 101 returns the process to S315 and repeats taking of a content. When the determination result in S316 is Yes, the CPU 101 executes the file closing process (S317). At this time, the CPU 101 records the taken content as a single data file and gives the group ID generated in S314 to the data file. The content is retaken as mentioned above. Then, the CPU 101 proceeds with the process to S307 from "C".

When the determination result in S312 is No, neither the first button 113A nor the second button 113B has been operated. In this case, the CPU 101 determines whether the touch bar 114 is operated (S318). When the determination result in S318 is Yes, the CPU 101 displays the timeline image 220 on the display unit 105 (S319).

Then, the CPU 101 executes the timeline process mentioned later (S320). When the determination result in S318 is No or when the process in S320 has been executed, the CPU 101 determines whether a predetermined end condition is satisfied (S321). When the determination result in S321 is Yes, the process of the flowchart in FIG. 3 is finished. When the determination result in S321 is No, the CPU 101 proceeds with the process to S301 from "D". For example, when the power key 117 is operated and the power is disconnected, the CPU 101 may determine that the predetermined end condition is satisfied.

Figure 4:
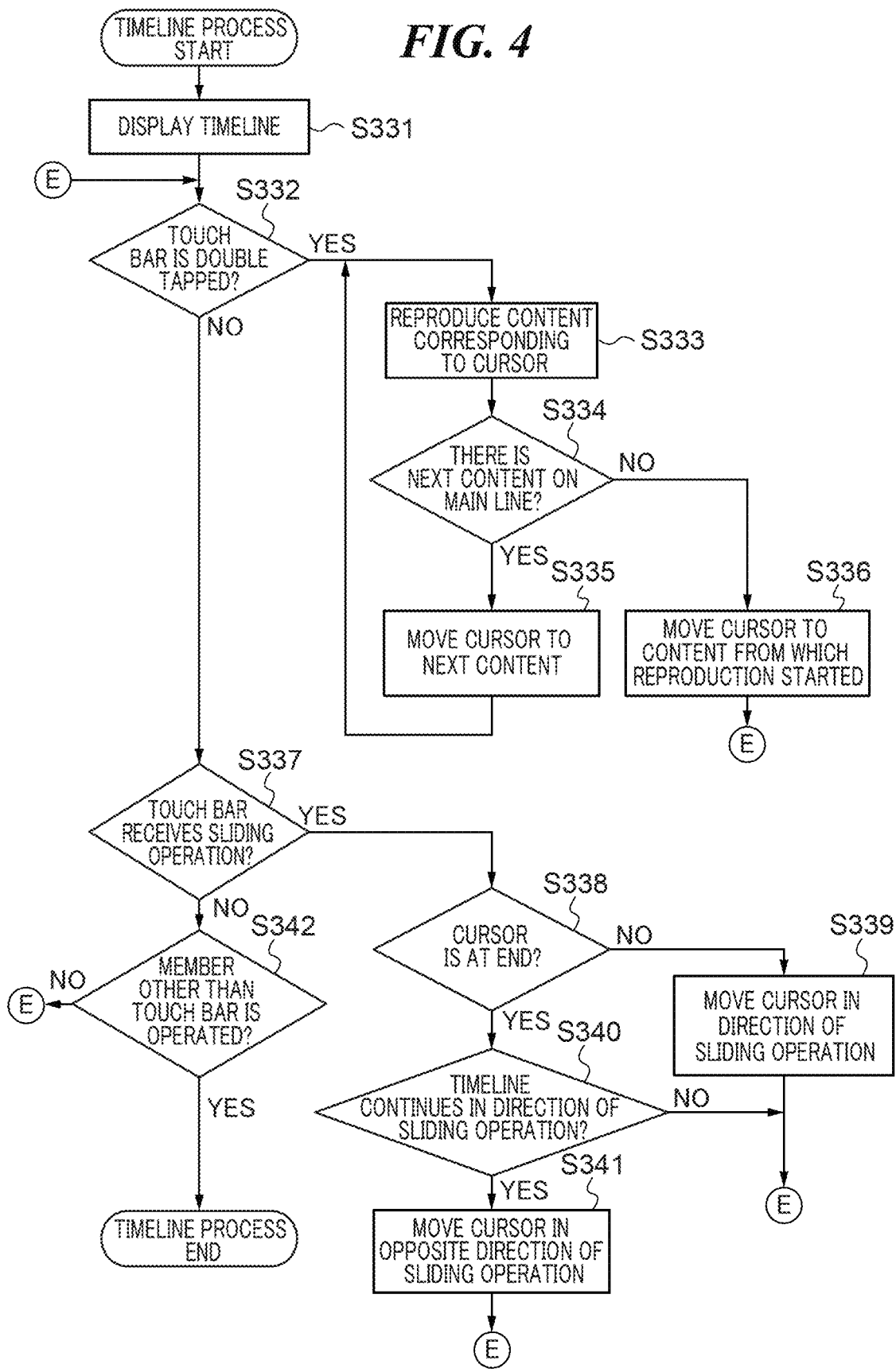
FIG. 4 is a flowchart showing a flow of a timeline process concerning the first embodiment.

Next, the timeline process in S310 and S320 in FIG. 3 will be described. As mentioned above, the first button 113A functions as the take button and the second button 113B functions the retake button in the first embodiment. FIG. 4 is a flowchart showing a flow of the timeline process concerning the first embodiment.

When the timeline process starts, the CPU 101 displays the timeline image 220 on the display unit 105 (S331). The CPU 101 determines whether a double-tap operation is given to the touch bar 114 (S332).

When the determination result in S332 is Yes, the CPU 101 controls so as to reproduce the content of the thumbnail image on which the cursor 222 is located (S333). After reproducing the content, the CPU 101 determines whether there is a next content on the main line 221 (S334).

When the determination result in S334 is Yes, the CPU 101 moves the cursor 222 to the next content on the main line 221 (S335). Then, the CPU 101 proceeds with the process to S333 and reproduces the next content. When the determination result in S334 is No, the CPU 101 moves the cursor 222 to the content from which the reproduction started because there is no next content to be reproduced (S336). The contents of the thumbnail images on the main line 221 are sequentially reproduced by the above process. Then, the CPU 101 proceeds with the process to S332 from "E".

When the determination result in S332 is No, no double-tap operation is given to the touch bar 114. In this case, the CPU 101 determines whether a slide operation is given to the touch bar 114 (S337). When the determination result in S337 is Yes, the CPU 101 determines whether the cursor 222 is located on an end region of the timeline image 220 (an end region of the display unit 105) that is currently displayed on the display unit 105 (S338).

As mentioned above, the regions are arranged on the main line 221 of the timeline image 220 in time series and the thumbnail images are displayed on the main line 221. Depending on the number of the thumbnail images in the direction of the main line 221, it may be difficult to display all images of the timeline image 220 on the display unit 105. In this case, a part of the regions of the timeline image 220 is displayed on the display unit 105. When the cursor 222 does not reach an end region of the display unit 105, the determination result in S338 is No. In this case, since the slide operation is given to the touch bar 114, the CPU 101 moves the cursor 222 in the same direction as the slide direction of the slide operation given to the touch bar 114 (S339).

In the meantime, when the determination result in S338 is Yes, the cursor 222 is located on the end region of the display unit 105. In this case, the CPU 101 determines whether the area of the timeline image 220 that is not displayed on the display unit 105 continues in the same direction as the slide direction of the slide operation (S340).

When the determination result in S340 is No, the cursor 222 is located on the head or newest region on the main lines 221. The thumbnail image of the newest region on the main line 221 shows the newest content. The thumbnail image of the head region shows the content taken at the beginning.

When the determination result in S340 is No, the CPU 101 proceeds with the process to S332 from "E" because there is no region following the timeline image 220 currently displayed on the display unit 105. When the determination result in S340 is Yes, there is a region following the timeline image 220 currently displayed on the display unit 105. Accordingly, the CPU 101 scrolls the timeline image 220 in the opposite direction of the slide direction (S341). Thereby, the scrolled timeline image 220 is displayed on the display unit 105. Then, the CPU 101 proceeds with the process to S332 from "E".

When the determination result in S337 is No, nether of a double-tap operation nor a slide operation is given to the touch bar 114. In this case, the CPU 101 determines whether a member other than the touch bar 114 is operated (S318). When the determination result in S342 is No, the CPU 101 proceeds with the process to S332 from "E". When the determination result in S342 is Yes, the timeline process is finished.

FIG. 5A through FIG. 7B are views showing screen transition examples in cases where slide operations are given to the touch bar 114. In a state of FIG. 5A, the timeline image 220 is displayed on the display unit 105. The cursor 222 is located at the center of the main line 221.

A user shall give a slide operation to the touch bar 114 in the direction (hereinafter referred to as a right direction) from the second button 113B toward the first button 113A in this state. The right direction corresponds to the time-forward direction on the main line 221. The rightward slide operation to the touch bar 114 moves the cursor 222 on the main line 221 by one region as shown in FIG. 5B. Thereby, the cursor 222 is located on the thumbnail image showing the following content (next newer content) on the main line 221.

Furthermore, the user shall give a rightward slide operation to the touch bar 114 from the state of FIG. 5B. The slide operation to the touch bar 114 moves the cursor 222 by one region as shown in FIG. 6A.

Figure 6A:
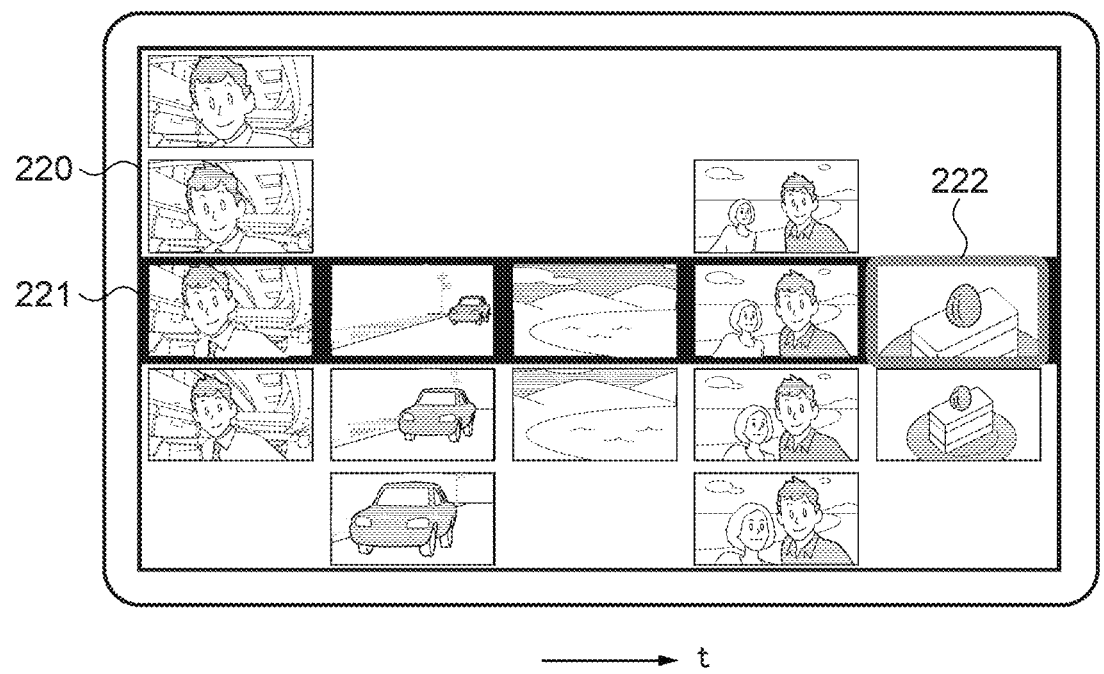
FIG. 6A and FIG. 6B are views describing screen transition examples from the screen in FIG. 5B.

The cursor 222 is located on the end region of the display unit 105 in the state of FIG. 6A. Although the state of FIG. 6A does not show, a newer region shall continue in the timeline image 220.

When the user gives a slide operation in the right direction from the state of FIG. 6A, the CPU 101 scrolls the timeline image 220 in the opposite direction (left direction) of the direction of the slide operation by one region. At this time, the position of the cursor 222 does not change. The left direction corresponds to the time-reverse direction on the main line 221. Thereby, the timeline image 220 shown in FIG. 6B is displayed on the display unit 105.

Figure 6B:
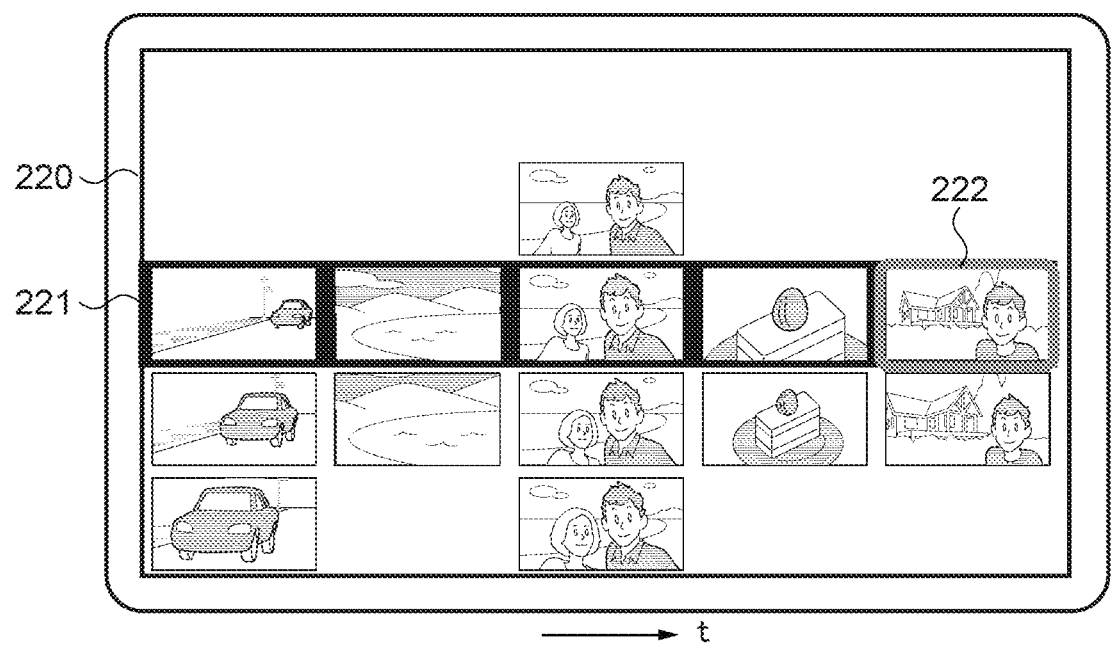

In the state of FIG. 6B, the cursor 222 shall be located on the newest region of the timeline image 220. That is, no newer region of the timeline image 220 shall continue. In such a state, the cursor 222 is located on the thumbnail image showing the newest content.

The direction of the main line 221 shown in FIG. 5A through FIG. 6B corresponds to the direction in which the touch bar 114 extends as shown in FIG. 1B. For example, the direction of the main line 221 is parallel to the direction in which the touch bar 114 extends. When the user gives a slide operation to the touch bar 114 in the right direction, the cursor 222 displayed on the display unit 105 can be moved in the right direction (time-forward direction). Accordingly, when the user gives a rightward slide operation to the touch bar 114, the cursor 222 can be moved to the newest region of the main line 221.

When adding a new content, the user operates the first button 113A that functions as the take button after moving the cursor 222 to the newest region of the main line 221. The user who is holding the grip 116 operates the first button 113A after giving the rightward slide operation to the touch bar 114 with the thumb of the holding hand. The first button 113A is arranged at the position near the right end 114A of the touch bar 114. Accordingly, when taking a content, the user is able to smoothly move the thumb to the first button 113A that functions as the take button after giving the rightward slide operation with the thumb of the hand holding the image pickup apparatus 100. Since the above configuration is employed, the user can perform the taking operation with the satisfactory operability.

Figure 5A:
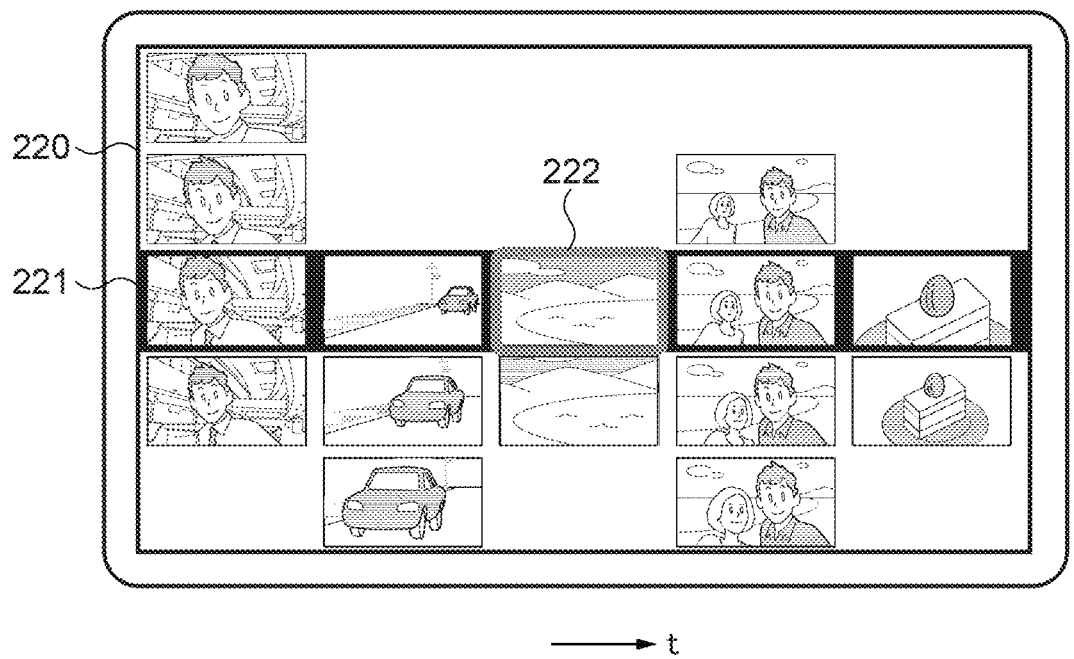
FIG. 5A and FIG. 5B are views describing screen transition examples concerning the first embodiment.
Figure 5B:
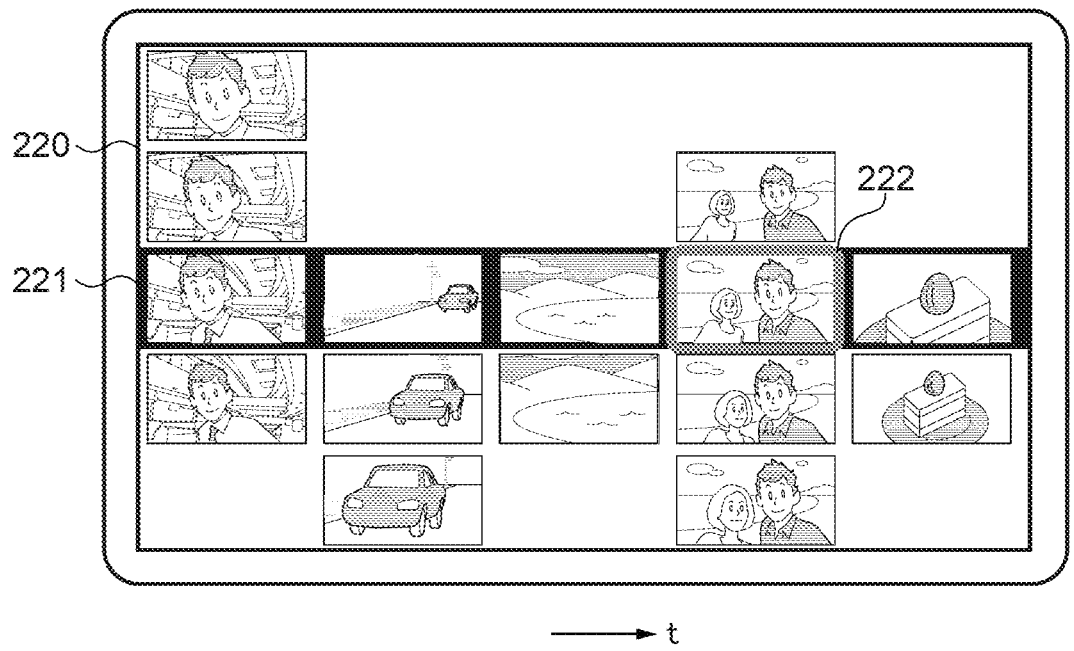
Figure 7A:
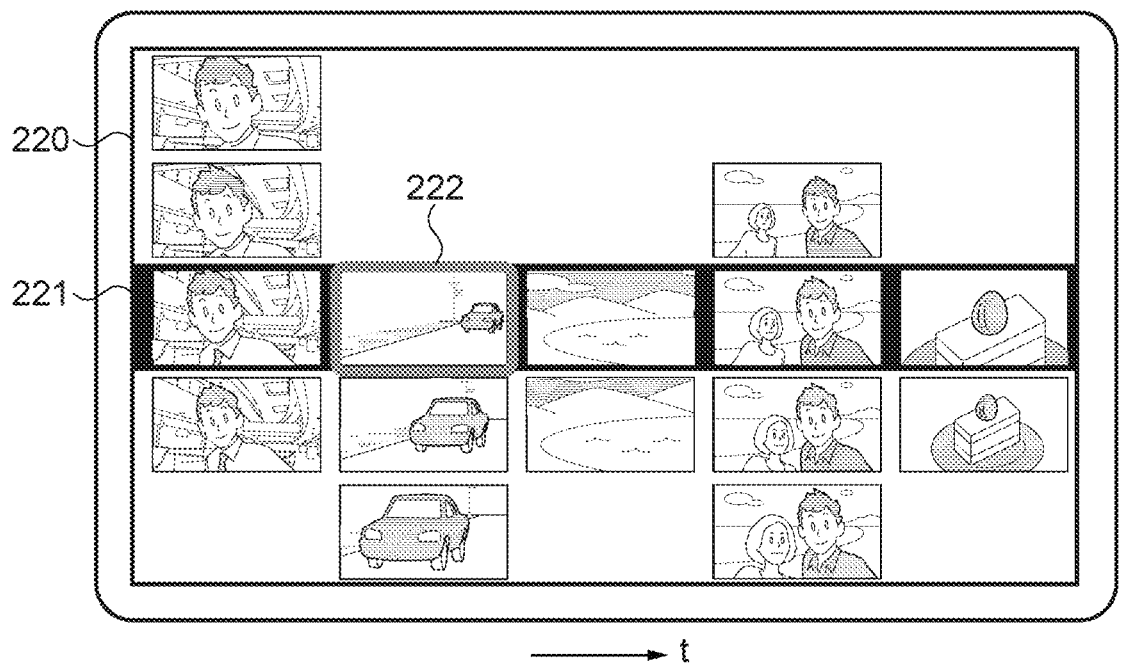
FIG. 7A and FIG. 7B are views describing screen transition examples from the screen in FIG. 5A.

In the meantime, the user shall give a slide operation to the touch bar 114 in the direction (left direction) toward the left end 114B from the right end 114A in the state where the timeline image 220 is displayed as shown in FIG. 5A. In this case, the cursor 222 moves by one region in the left direction. FIG. 7A shows the timeline image 220 in which the cursor 222 has moved in the left direction from the state of FIG. 5A by the user's leftward slide operation to the touch bar 114.

Figure 7B:
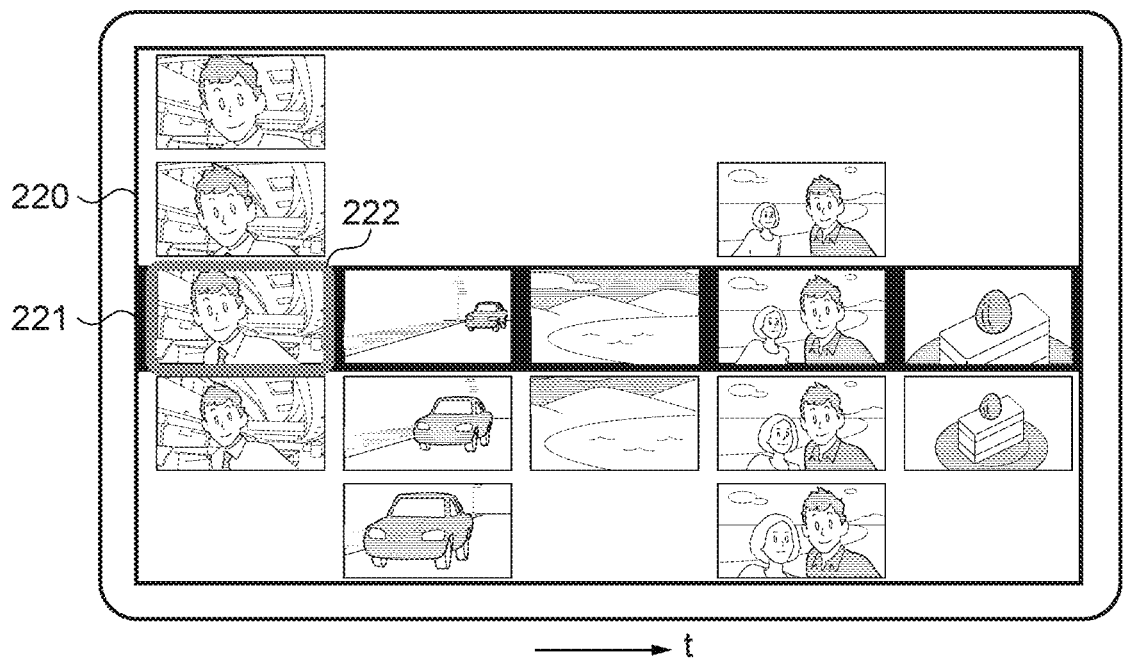

When the user gives the leftward slide operation to the touch bar 114 from the state of FIG. 7A, the cursor 222 moves leftward of the main line 221 by one region as shown in FIG. 7B. Whenever the user gives the leftward slide operation to the touch bar 114, the position of the cursor 222 on the main line 221 moves towards the head of the timeline image 220 by one region (in the time-reverse direction).

The cursor 222 is located on the end region of the display unit 105 in FIG. 7B. The position of the cursor 222 in FIG. 7B shall be the position of the head region on the main line 221. In this case, a region of the timeline image 220 does not continue in the time-reverse direction. As mentioned above, when the user gives the leftward side operation to the touch bar 114, the cursor 222 is displayed on the head region of the main line 221 or on any one region up to the head region.

Accordingly, the user who is holding the grip 116 is able to put the cursor 222 on the thumbnail image of the content that is subjected to retaking by giving the leftward slide operation with the thumb of the holding hand. As mentioned above, the second button 113B that functions as the retake button is provided at the position in the vicinity corresponding to the left end 114B of the touch bar 114. Accordingly, the user is able to smoothly move the thumb to the second button 113B after giving the slide operation to the touch bar 114. Thereby, the user can perform the retaking operation with the satisfactory operability.

When the second button 113B that functions as the retake button is operated, the CPU 101 adds a thumbnail image of a retaken content (a moving image or a static image) to the take axis. The take axis intersects perpendicularly with the main line 221 as the time axis. As shown in FIG. 7A etc., the main line 221 of the timeline image 220 is located at the center of the take axis. The CPU 101 adds the thumbnail image of the retaken content in an area (hereafter referred to as a lower area) nearer to the grip 116 than the main line 221.

As mentioned above, the operation unit 111 is provided between the display unit 105 and the grip 116 in the image pickup apparatus 100. The first button 113A that functions as the take button and the second button 113B that functions as the retake button are provided between the touch bar 114 and the grip 116 in the operation unit 111.

The first button 113A that functions as the take button is provided at the position near the right end 114A of the touch bar 114, and the second button 113B that functions as the retake button is provided at the position near the left end 114B of the touch bar 114. Since the members of the operation unit 111 are arranged as mentioned above in the image pickup apparatus 100, a user is able to operate the members of the operation unit 111 smoothly when taking and editing a content. This significantly improves the operability at the time when a user takes and edits a content while holding the grip 116.

Next, the thumb rest area 115 will be described. As shown in FIG. 1B, the thumb rest area 115 is provided between the first button 113A and the second button 113B. The thumb rest area 115 is a predetermined area provided to put a user's thumb while not operating. No operating member is provided in the thumb rest area 115.

As mentioned above, a user holds the grip 116 by a single hand and operates the first button 113A, second button 113B, and touch bar 114 with the thumb of the holding hand. The thumb rest area 115 is provided between the touch bar 114 and the grip 116 in the Z direction and is provided between the first button 113A and the second button 113B in the X direction.

When a user who is holding the grip 116 puts a thumb on the thumb rest area 115, the thumb does not contact the first button 113A, second button 113B, and touch bar 114. Moreover, since the thumb rest area 115 is provided at the above-mentioned position, a user is able to quickly move a thumb put on the thumb rest area 115 to the first button 113A, the second button 113B, or the touch bar 114.

According to data from National Institute of Advanced Industrial Science and Technology, the 95th percentile of a central finger width of a thumb of Japanese male is "19.4 mm" and that of Japanese female is "17.0 mm". Accordingly, the diameter of the thumb rest area 115 is preferably more than "19.4 mm".

Moreover, one or more hollows or projections may be provided in the central part or the peripheral part of the thumb rest area 115. In such h a case, a user is able to recognize that a thumb is put on the thumb rest area 115 tactually. As mentioned above, the operability of content taking and contents editing improves more because the thumb rest area 115 is provided in the image pickup apparatus 100.

Next, a second embodiment will be described. In the second embodiment, the first button 113A in FIG. 1B functions as the retake button and the second button 113B functions as the take button. As mentioned above, the function of the first button 113A and the function of the second button 113B can be exchanged by control of the CPU 101, for example. Accordingly, in the second embodiment, the function of the first button 113A and the function of the second button 113B in the first embodiment are exchanged. It should be noted that the function of the first button 113A and the function of the second button 113B may be fixed. For example, the first button 113A may function only as the retake button, and the second button 113B may function only as the take button.

In the second embodiment, the second button 113B that functions as the take button corresponds to the first instruction member. Moreover, the first button 113A that functions as the retake button corresponds to the second instruction member. In this case, the first instruction member and the second instruction member are arranged in a second arrangement relationship that is different from the first arrangement relationship. For example, the CPU 101 can allocate the function as the retake button to the first button 113A, and can allocate the function as the take button to the second button 113B. When the first button 113A functions as the retake button and the second button 113B functions as the take button, the content of the timeline process differs from the first embodiment.

Figure 8:
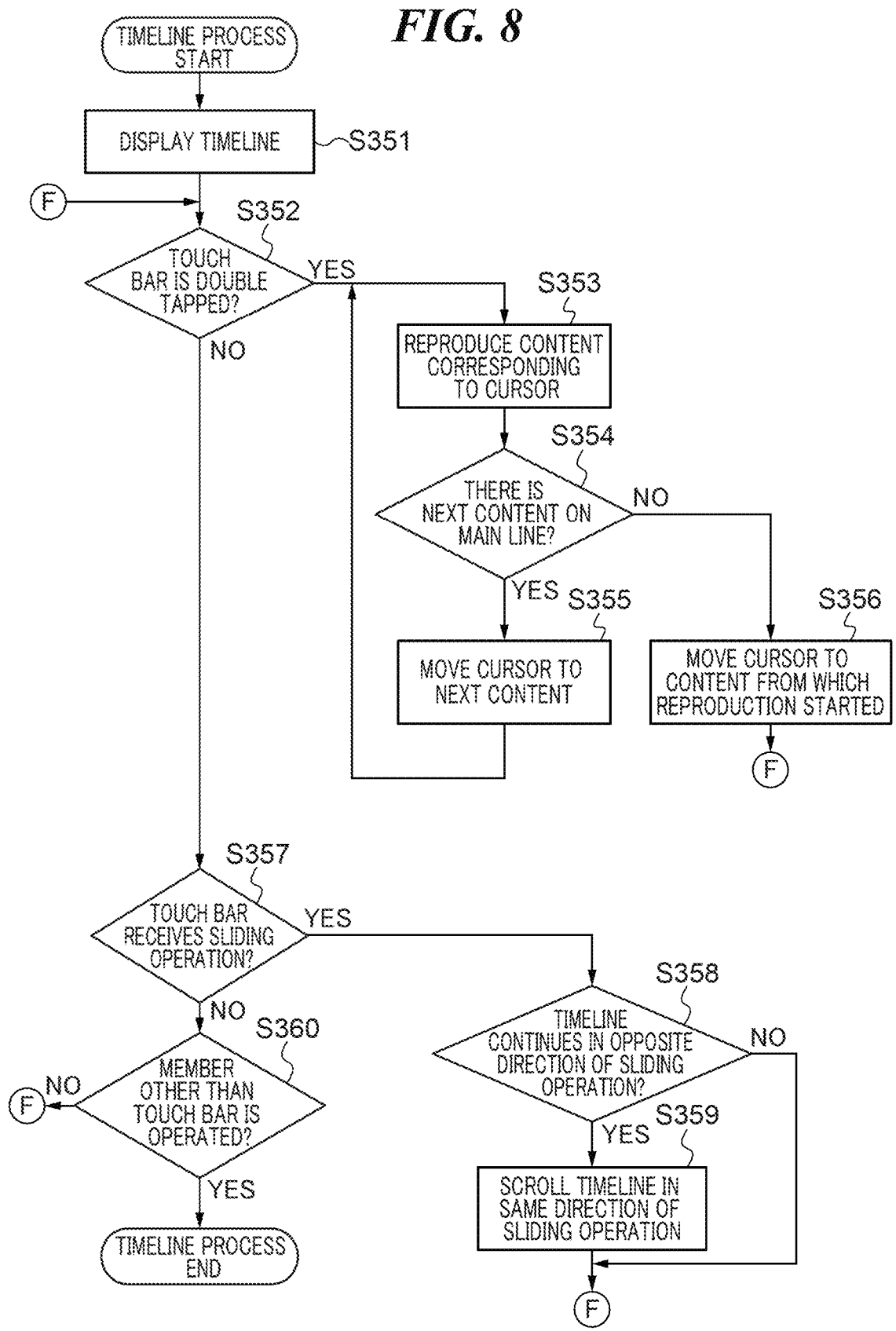
FIG. 8 is a flowchart showing a flow of a timeline process concerning a second embodiment.

A flow of the timeline process in the second embodiment will be described by referring to FIG. 8. The CPU 101 displays the timeline image 220 on the display unit 105 (S351). The CPU 101 determines whether a double-tap operation is given to the touch bar 114 (S352).

When the determination result in S352 is Yes, the CPU 101 reproduces the content indicated by the thumbnail image on which the cursor 222 is located (S353). Then, the CPU 101 determines whether there is a next content on the main line 221 (S354). When the determination result in S354 is Yes, the cursor 222 is moved to the next content (S355) because the next content is there. Then, the CPU 100 proceeds with the process to S353. The contents of the thumbnail images on the main line 221 are sequentially reproduced by the above process.

When the determination result in S354 is No, the CPU 101 moves the cursor 222 to the content from which the reproduction of the contents started (S356). Then, the CPU 101 proceeds with the process to S352 from "F" and returns the display content to the state where the timeline image 220 has been displayed. The processes from S353 to S356 are the same as that of the first embodiment.

When the determination result in S352 is No, no double-tap operation is given to the touch bar 114. In this case, the CPU 101 determines whether a slide operation is given to the touch bar 114 (S357). When the determination result in S357 is Yes, the CPU 101 determines whether a region of the timeline image 220 that is not displayed continues in the opposite direction of the slide direction of the slide operation given to the touch bar 114 (S358).

When the determination result in S358 is Yes, the CPU 101 fixes the position of the cursor 222 and scrolls the timeline image 220 in the same direction (left direction) as the slide direction of slide operation (S359). Thereby, the scrolled timeline image 220 is displayed on the display unit 105. When the determination result in S358 is No, the CPU 101 proceeds with the process to S352 from "F".

When the determination result in S357 is No, a double-tap operation and a slide operation are not given to the touch bar 114. The CPU 101 determines whether a member other than the touch bar 114 is operated (S360). When the determination result in S360 is No, the CPU 101 proceeds with the process to S352 from "F". When the determination result in S360 is Yes, the timeline process is finished.

Figure 9A:
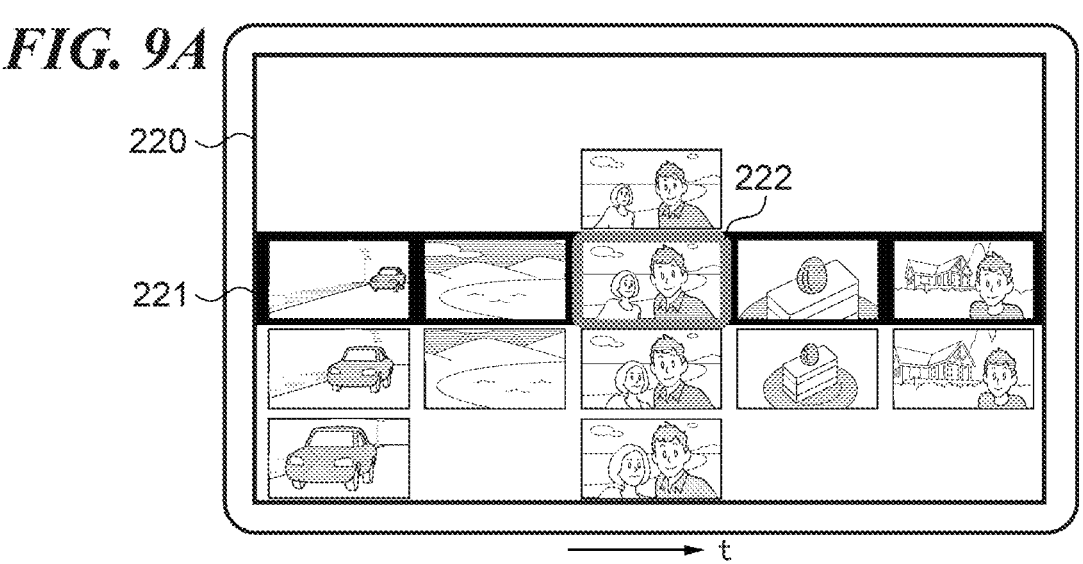
FIG. 9A, FIG. 9B, and FIG. 9C are views describing screen transition examples concerning the second embodiment.

FIG. 9A through FIG. 10B are views showing screen transition examples in cases where slide operations are given to the touch bar 114. In the state of FIG. 9A, the cursor 222 is located at the center of the main line 221 currently displayed on the display unit 105. In the second embodiment, the position of the cursor 222 is fixed and the timeline image 220 scrolls.

The user shall give a leftward slide operation to the touch bar 114 in the state of FIG. 9A. The CPU 101 does not change the position of the cursor 222 and scrolls the timeline image 220 currently displayed on the display unit 105 in the left direction. Thereby, the timeline image 220 shown in FIG. 9B is displayed on the display unit 105.

Figure 9B:
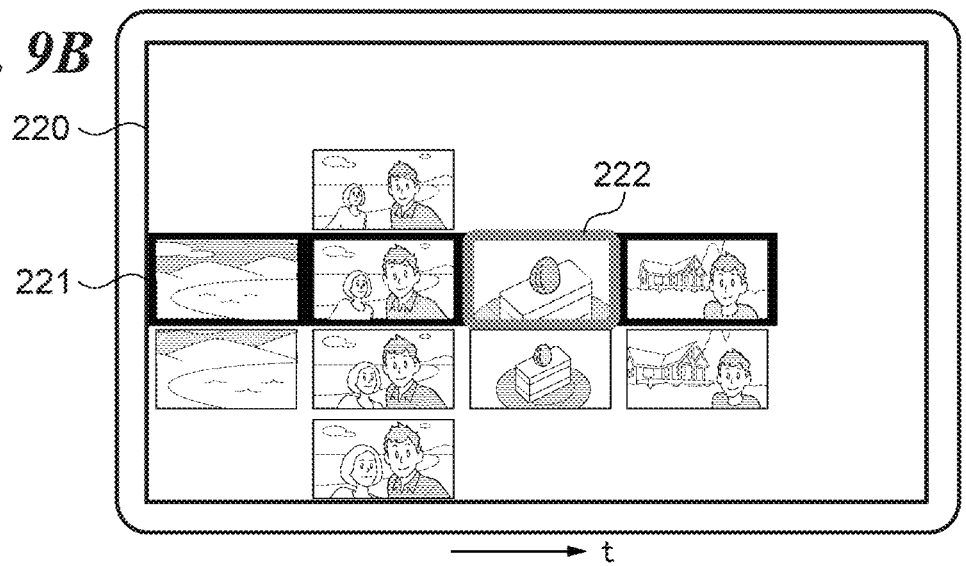

The user shall give a leftward slide operation to the touch bar 114 in the state of FIG. 9B. The CPU 101 does not change the position of the cursor 222 and scrolls the timeline image 220 currently displayed on the display unit 105 in the left direction. Thereby, the timeline image 220 shown in FIG. 9C is displayed on the display unit 105.

Figure 9C:
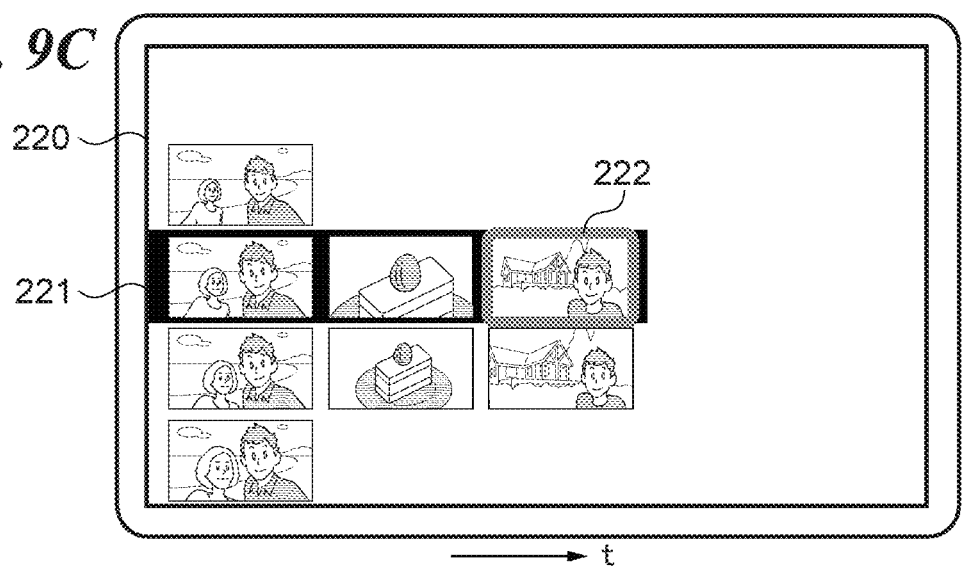

In the state of FIG. 9C, the cursor 222 is located on the newest region of the main line 221. That is, the user is able to move the cursor 222 to the position of the thumbnail image of the newest content by the leftward slide operation to the touch bar 114. The second button 113B that functions as the take button is arranged at the position near the left end 114B of the touch bar 114.

Accordingly, when the user gives the leftward slide operation to the touch bar 114 with the thumb of the hand holding the grip 116, the cursor 222 is located on the thumbnail image of the newest content.

The user is able to smoothly move the thumb that has given the leftward slide operation to the second button 113B that functions as the take button. Then, when the second button 113B that functions as the take button is operated, the CPU 101 adds a taken new content to the main line 221. Accordingly, taking of a new content can be instructed with the satisfactory operability.

Figure 10A:
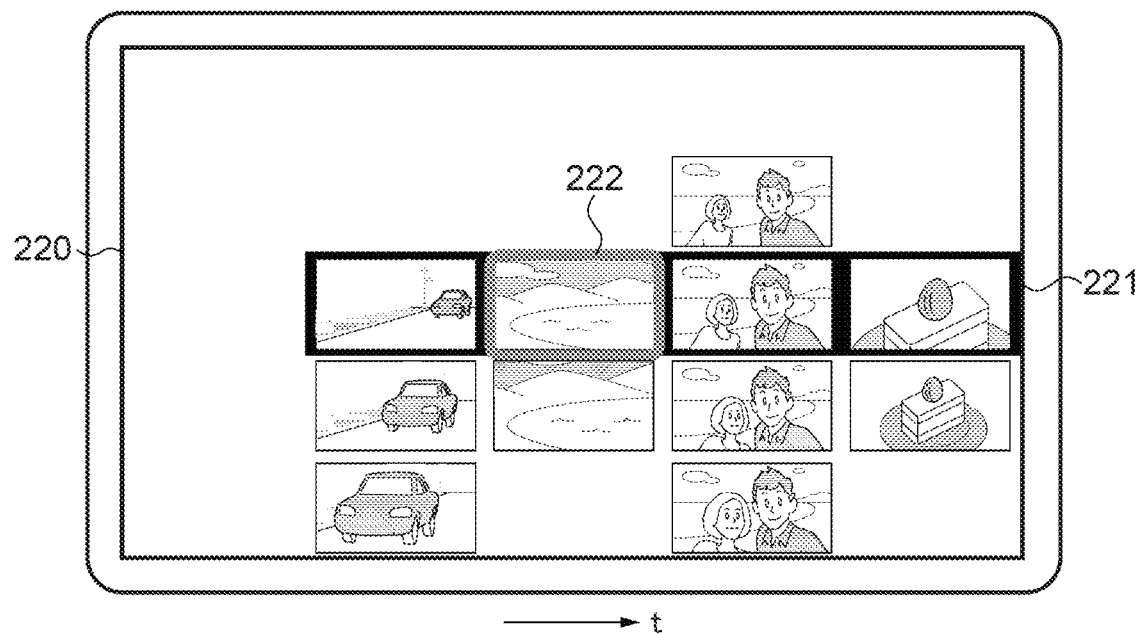
FIG. 10A and FIG. 10B are views describing screen transition examples from the screen in FIG. 9A.

In the meantime, the user shall give a rightward slide operation to the touch bar 114 in the state of FIG. 9A. In this case, the CPU 101 does not change the position of the cursor 222 and scrolls the timeline image 220 in the right direction. Thereby, the timeline image 220 in FIG. 10A is displayed on the display unit 105.

Figure 10B:
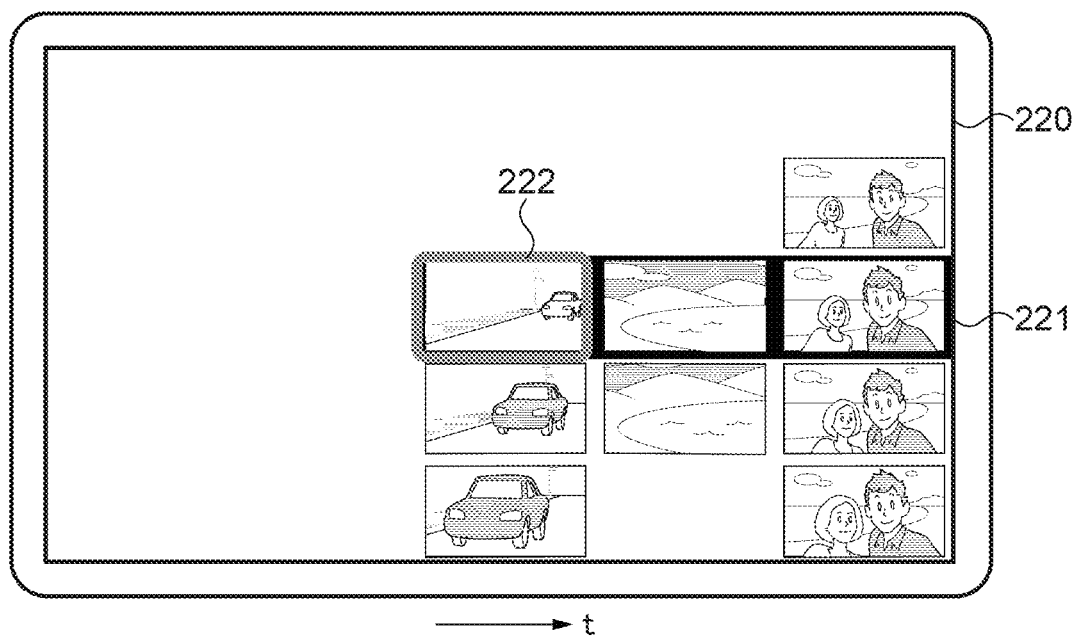

The user shall give the rightward slide operation to the touch bar 114 in the state of FIG. 9A. In this case, the CPU 101 does not change the position of the cursor 222 and scrolls the timeline image 220 in the right direction. Thereby, the timeline image 220 in FIG. 10B is displayed on the display unit 105. In the state of FIG. 10B, the cursor 222 is located on the head region of the main line 221.

Accordingly, when the user continuously gives the rightward slide operations to the touch bar 114, the cursor 222 is located on the thumbnail image of the head content of the main line 221 or on any one thumbnail image up to the head content. The first button 113A arranged at the position near the right end 114A of the touch bar 114 functions as the retake button. Accordingly, when the user gives the leftward slide operation to the touch bar 114 with the thumb of the hand holding the grip 116, the cursor 222 is located on the thumbnail image of a retake target.

Then, the user is able to smoothly move the thumb that has given the slide operation to the first button 113A that functions as the retake button. When the first button 113A that functions as the retake button is operated, the retaken content is added in the area below the main line 221 along the take axis. Thereby, the user can perform the retaking operation with the satisfactory operability.

Next, a third embodiment of the present invention will be described. Although the operation to the touch bar 114 is a slide operation in the first embodiment and second embodiment, the operation to the touch bar 114 is a touch operation to the right end 114A or the left end 114B in the third embodiment.

Figure 11A:
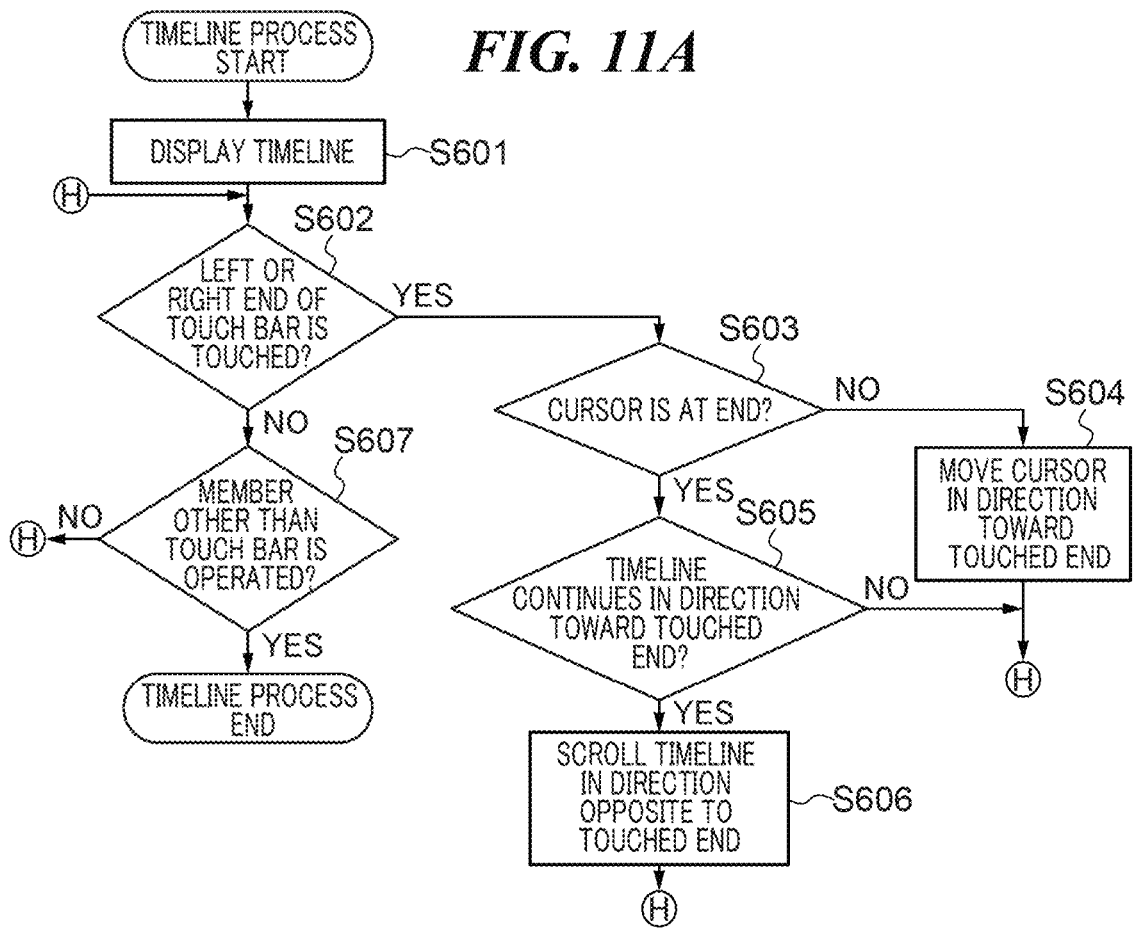
FIG. 11A and FIG. 11B are flowcharts showing a flow of a timeline process concerning a third embodiment.

As mentioned above, the first button 113A can also function as the take button and can also function as the retake button. Moreover, the second button 113B can also function as the take button, and can also function as the retake button. When the first button 113A functions as the take button (first instruction member) and the second button 113B functions as the retake button (second instruction member), a timeline process in FIG. 11A is executed in the third embodiment. In this case, the first instruction member and the second instruction member are arranged in the first arrangement relationship.

The CPU 101 displays the timeline image 220 on the display unit 105 (S601). Then, the CPU 101 determines whether a touch operation is given to the right end 114A or the left end 114B of the touch bar 114 (S602).

When the determination result in S602 is Yes, the CPU 101 determines whether the cursor 222 is located on the end region of the display unit 105 (S603). When the determination result in S603 is No, the CPU 101 moves the cursor 222 in the same direction as the direction toward the touched end of the touch bar 114 (S604). When the determination result in S603 is Yes, the CPU 101 determines whether a region of the timeline image 220 continues in the same direction as the direction toward the touched end of the touch bar 114 (S605). When the determination result in S605 is Yes, the CPU 101 scrolls the timeline image 220 in the opposite direction to the direction toward the touched end and displays it on the display unit 105 (S606).

When the determination result in S602 is No, the CPU 101 determines whether an operation member other than the touch bar 114 is operated (S607). When the determination result in S607 is No, the CPU 101 proceeds with the process to S602 from "H". When the determination result in S607 is No after executing the process in S604, the CPU 101 proceeds with the process to S602 from "H" similarly. In the meantime, when the determination result in S607 is Yes, the timeline process is finished.

Figure 11B:
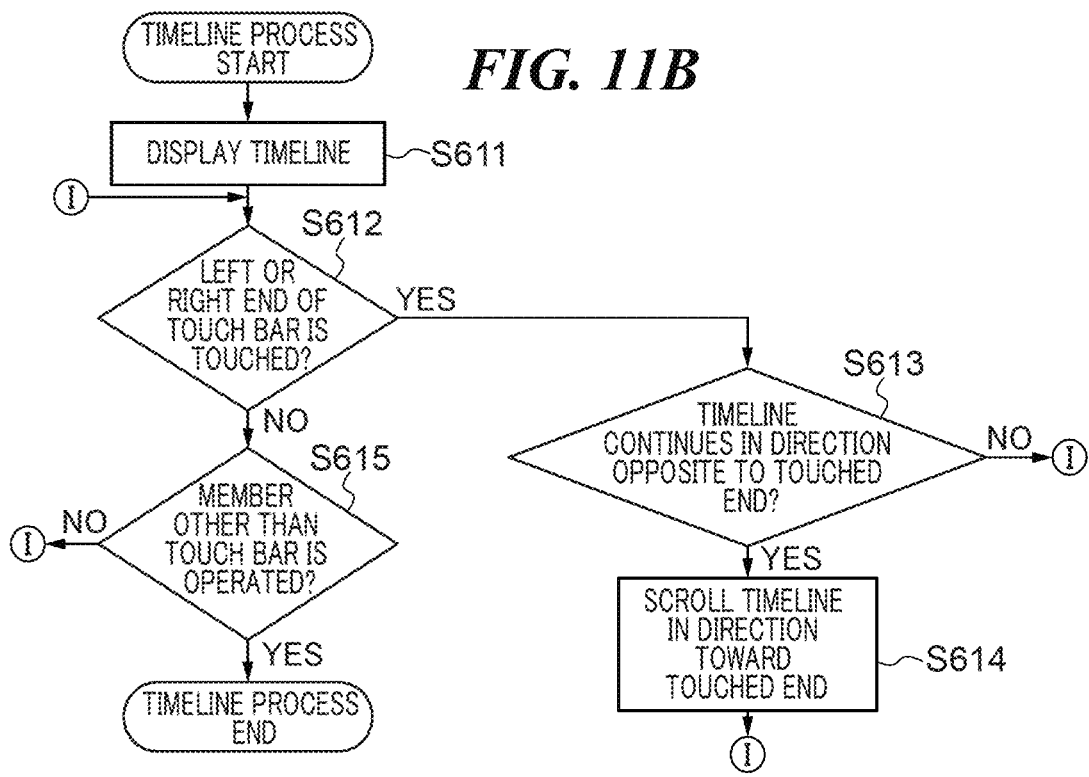

Next, a case where the first button 113A functions as the retake button (second instruction member) and the second button 113B functions as the take button (first instruction member) will be described. In this case, the first instruction member and the second instruction member are arranged in the second arrangement relationship. In this case, a timeline process in FIG. 11B is executed. The CPU 101 displays the timeline image 220 on the display unit 105 (S611).

Then, the CPU 101 determines whether a touch operation is given to the right end 114A or the left end 114B of the touch bar 114 (S612). When the determination result in S612 is Yes, the CPU 101 determines whether a region of the timeline image 220 continues in the opposite direction to the direction toward the touched end of the touch bar (S613). When the determination result in S613 is Yes, the CPU 101 scrolls the timeline image 220 in the same direction as the direction toward the touched end (S614). Thereby, the scrolled timeline image 220 is displayed on the display unit 105.

When the determination result in S612 is No, the CPU 101 determines whether an operation member other than the touch bar 114 is operated (S615). When the determination result in S615 is No, the CPU 101 proceeds with the process to S612 from "I". When the determination result in S613 is No and when the process in S614 is performed, the CPU 101 proceeds with the process to S612 from "I" similarly. When the determination result in S615 is Yes, the timeline process is finished.

In the third embodiment, the user is able to move the cursor 222 to any one region on the main line 221 by giving a touch operation to the right end 114A or the left end 114B of the touch bar 114. For example, the user is able to put the cursor 222 on any one region including the head region and the newest region on the main line 221 by giving the above-mentioned touch operation.

The user is able to smoothly move the thumb to the first button 113A or the second button 113B after giving a touch operation to the right end 114A or the left end 114B of the touch bar 114. In the third embodiment, the user is able to put the cursor 222 on a desired region by the touch operation to the right end 114A or the left end 114E of the touch bar 114 in addition to the slide operation described in the first and second embodiments. Thereby, the user is able to take a new content and to retake a taken content with still better operability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084358, filed Apr. 25, 2019; which is hereby incorporated by reference herein in its entirety.

What is claimed is:
1. An image pickup apparatus comprising:
a display unit;
a grip;
an operation unit comprising:

a touch operation member that is used for a slide operation that designates any one of taken contents and that extends in a slide direction;
a first instruction member used for a take instruction; and
a second instruction member used for a retake instruction; and
a controller that changes a display content on the display unit according to a slide operation to the touch operation member,
wherein the operation unit is provided between the grip and the display unit in a direction that perpendicularly intersects with the slide direction of the touch operation member,
wherein the first instruction member and the second instruction member are provided between the touch operation member and the grip in the direction that perpendicularly intersects with the slide direction, and
wherein the first instruction member is provided at a side of one end of the touch operation member in the slide direction and the second instruction member is provided at a side of another end of the touch operation member in the slide direction.

2. The image pickup apparatus according to claim 1, wherein a predetermined area where no operating member is arranged is provided between the first instruction member and the second instruction member in the slide direction.

3. The mage pickup apparatus according to claim 2, wherein one of a projection and a hollow is formed in the predetermined area.

4. The image pickup apparatus according to claim 1, wherein the operation unit is provided at a position that is operatable with a finger of a hand that holds the grip.

5. The image pickup apparatus according to claim 1, further comprising:
an image pickup unit that takes a content, and
an image pickup lens that is detachably attached to the image pickup unit.

6. The image pickup apparatus according to claim 1, wherein the controller displays thumbnail images of the taken contents side by side along a time axis on the display unit, and
wherein the controller adds a thumbnail image of a new taken content in a newest region in the time axis in a case where the take instruction is given to the first instruction member.

7. The image pickup apparatus according to claim 6, wherein the controller adds a thumbnail image showing a retaken content to an axis different from the time axis in a case where the retake instruction is given to the second instruction member.

8. The image pickup apparatus according to claim 6, wherein a direction of the time axis corresponds to a direction in which the touch operation member extends.

9. The image pickup apparatus according to claim 6, wherein the controller moves a cursor that designates one of the thumbnail images displayed side by side along the time axis in response to a slide operation to the touch operation member in a case where the first instruction member and the second instruction member are arranged in a first arrangement relationship, and
wherein the controller scrolls the display content currently displayed on the display unit in response to a slide operation to the touch operation member in a case where the first instruction member and the second instruction member are arranged in a second arrangement relationship different from the first arrangement relationship.

10. The image pickup apparatus according to claim 9, wherein the controller moves the cursor in response to a touch operation to one of the one end and the other end of the touch operation member in the first arrangement relationship.

11. The image pickup apparatus according to claim 9, wherein the controller scrolls the display content in response to a touch operation to one of the one end and the other end of the touch operation member in the second arrangement relationship.

12. An image pickup lens that is detachably attached to an image pickup apparatus, the image pickup apparatus comprising:
a display unit;
a grip;
an operation unit comprising:
a touch operation member that is used for a slide operation that designates any one of taken contents and that extends in a slide direction;
a first instruction member used for a take instruction; and
a second instruction member used for a retake instruction; and
a controller that changes a display content on the display unit according to a slide operation to the touch operation member,
wherein the operation unit is provided between the grip and the display unit in a direction that perpendicularly intersects with the slide direction of the touch operation member,
wherein the first instruction member and the second instruction member are provided between the touch operation member and the grip in the direction that perpendicularly intersects with the slide direction, and
wherein the first instruction member is provided at a side of one end of the touch operation member in the slide direction and the second instruction member is provided at a side of another end of the touch operation member in the slide direction.

* * * * *